(12) United States Patent
Fischer et al.

(10) Patent No.: US 8,866,354 B2
(45) Date of Patent: Oct. 21, 2014

(54) ELECTRICAL DRIVE UNIT FOR A MOTOR VEHICLE

(75) Inventors: Raphael Fischer, Herzogenaurach (DE); Michael Bogner, Eckental (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 193 days.

(21) Appl. No.: 13/513,697

(22) PCT Filed: Dec. 1, 2010

(86) PCT No.: PCT/EP2010/068652
§ 371 (c)(1),
(2), (4) Date: Jun. 4, 2012

(87) PCT Pub. No.: WO2011/069872
PCT Pub. Date: Jun. 16, 2011

(65) Prior Publication Data
US 2012/0242197 A1    Sep. 27, 2012

(30) Foreign Application Priority Data
Dec. 7, 2009    (DE) .......................... 10 2009 057 321

(51) Int. Cl.
*H02K 11/00*    (2006.01)
(52) U.S. Cl.
USPC ..................................... 310/67 R; 310/75 R
(58) Field of Classification Search
USPC .............................. 310/67 R, 75 R; 180/65.51
IPC .................................... H02K 7/14,21/22, 29/08
See application file for complete search history.

(56) References Cited

U.S. PATENT DOCUMENTS

| 8,035,270 | B2 * | 10/2011 | Marsh et al. | 310/216.023 |
| 2006/0272871 | A1 * | 12/2006 | Murata | 180/65.5 |
| 2009/0309462 | A1 * | 12/2009 | Maekawa et al. | 310/67 R |
| 2010/0163323 | A1 * | 7/2010 | Pickholz | 180/65.51 |

FOREIGN PATENT DOCUMENTS

| JP | 2005253250 | 9/2005 |
| JP | 2007016841 | 1/2007 |
| JP | 2007253687 | 10/2007 |
| JP | 2008189118 | 8/2008 |

* cited by examiner

*Primary Examiner* — Hanh Nguyen
(74) *Attorney, Agent, or Firm* — Volpe and Koenig, P.C.

(57) ABSTRACT

An electrical drive unit for a motor vehicle, with the drive unit including a wheel-hub drive that drives a vehicle wheel and that is arranged on the vehicle wheel by a wheel bearing, the wheel-hub drive having a rotor and a stator. According to the invention, a sealing device is provided between the rotor and the stator, and/or between the rotor and a component adjacent to the rotor, and/or between the stator and a component adjacent to the stator. A sealing surface of the sealing device is arranged on a radius with the center point around a virtual tilt axis of the wheel bearing, or substantially along a tangent to the radius.

8 Claims, 4 Drawing Sheets

ELECTRICAL DRIVE UNIT FOR A MOTOR VEHICLE

BACKGROUND

The invention relates to an electrical drive unit for a motor vehicle in which a wheel hub drive driving a vehicle wheel is provided.

Such wheel hub drives are used, in particular, in electric vehicles. Because the wheel hub drives in these motor vehicles are arranged on the vehicle wheel, they are especially dependent on the weather conditions and must therefore be designed especially tight, in order to prevent penetration of moisture, for example, water, and/or foreign bodies, for example, dirt particles, into the wheel hub drive, in order to prevent resulting damage on the wheel hub drive due to moisture and/or foreign bodies.

SUMMARY

The objective of the invention is therefore to provide an electric drive unit for a motor vehicle, wherein this drive unit has an especially effective seal relative to the penetration of moisture and/or foreign bodies into the wheel hub drive.

The objective is met according to the invention by the features of the invention. Advantageous designs are specified below and in the claims.

The electrical drive unit according to the invention for a motor vehicle has a wheel hub drive that drives a vehicle wheel and that is arranged above a wheel bearing on the vehicle wheel, wherein the wheel hub drive has a rotor and a stator. According to the invention it is provided that a sealing device is provided between the rotor and the stator and/or between the rotor and a component adjacent to the rotor and/or between the stator and a component adjacent to the stator, wherein a sealing surface of the sealing device is arranged on a radius with a center point around a virtual tilt axis of the wheel bearing or essentially along a tangent to this radius.

By providing such a sealing device on an electrical drive unit that is arranged on a vehicle wheel, an especially effective seal relative to moisture and/or foreign bodies is possible, wherein the seal has an especially low-friction and simultaneously low-loss design. When the wheel bearing tilts, a relative movement is realized between the stator and the rotor, wherein this relative movement takes place on a radius about the tilt axis of the wheel bearing. Because the sealing device is arranged on this radius or essentially along a tangent to this radius, it is possible that when the tilt axis tilts, the sealing surfaces arranged on the respective components, such as the rotor, the stator, or the components adjacent to the stator and the rotor can be prevented from approaching or moving away from each other. In this way it is possible for the sealing surface of the sealing device that is designed as an active sealing surface to act in the radial direction relative to the tilt axis of the wheel bearing and therefore an axial displacement of the rotor and/or the stator and/or the adjacent components has no significant effect on the gap width between these components in which the sealing device is arranged. This is then also possible especially if, for example, when the motor vehicle driving around a tight curve in which a strong tilting of the wheel bearing and thus an increased displacement of the components of the wheel hub drive in the axial direction of the stator, the rotor, and the adjacent components is realized. Therefore it is possible that an efficient seal can be realized on a very large radius with a center around the virtual tilt axis of the wheel bearing.

According to one advantageous design of the invention, the sealing surface has a dome shape with a center around the virtual tilt axis of the wheel bearing. Domed or dome shape here means that the sealing surface in this region is advantageously designed as a flattened spherical section formed as a flat dome. Therefore it is possible to take into account the main direction of the relative displacement of the bordering components to be sealed, such as the rotor, the stator, and/or the components adjacent thereto, in a tilting of the tilting axis.

Furthermore it is preferably provided that the sealing device has a sealing element that is designed as a gap seal, in particular, as a labyrinth seal. By means of the labyrinth seal it is possible to generate a contact-free seal. For the use of a labyrinth seal, the sealing element can advantageously be used also at high rotational speeds, high pressures, and/or high temperatures of the wheel hub drive. In addition, the use of such a labyrinth seal can prevent a penetration of foreign particles or foreign bodies in an especially effective way.

According to one preferred design of the invention, the sealing device further has a grease ring or an elastic filler or a plastic filter. By providing such a grease ring or a filler, an especially effective seal by the sealing device is possible. This grease ring or the filler can be arranged as a kind of preliminary seal around the peripheral surface of the actual sealing element, in order to be able to keep the sealing element itself as clean as possible and to prevent a direct effect of sprayed water and dust on the sealing element.

Furthermore, the sealing device is preferably arranged partially in a recess provided on the rotor and/or the stator and/or the adjacent component. In this way, at least one sub-region of the sealing device is protected in that it is advantageously embedded in the recess, wherein the forces acting on the sealing device can be reduced, so that the service life of the sealing device can be increased.

Furthermore, it is advantageously provided that the sealing device has a ring element, wherein the ring element has a sliding arrangement. The ring element can be provided, for example, in a recess of the opposite components to be sealed, such as the stator, the rotor, and/or the component adjacent thereto, wherein advantageously a filling is provided within these recesses by which the ring element can slide within the recesses, so that the ring element advantageously has a sliding arrangement on two opposing side surfaces of the ring element. In this way it is possible to distribute the shear rate of the sealing device to two joints or two recesses and thus to reduce it by half. In this way, the forces acting on the sealing device can be reduced, wherein the service life of the sealing device can be increased.

According to another advantageous design of the invention, in the region of the sealing device, a sub-region of the stator is arranged overlapping with a sub-region of the rotor and/or a sub-region of the stator is arranged overlapping with a sub-region of the component adjacent to the stator and/or a sub-region of the rotor is arranged overlapping with a sub-region of the component adjacent to the rotor. Through the overlapping arrangement, an especially effective sealing effect of the sealing device can be achieved, wherein the overlapping arrangement can already prevent the penetration of coarse dirt particles or foreign bodies into the gap between the respective components of the wheel hub drive in which the sealing device is provided.

Furthermore, the invention relates to a motor vehicle, in particular, an electric vehicle, comprising an electric drive unit designed and refined as described above.

BRIEF DESCRIPTION OF THE DRAWINGS

Below, the invention will be explained in more detail using preferred embodiments with reference to the attached drawings.

Shown are.

DETAILED DESCRIPTION OF THE PREFERRED EMBODIMENTS

Figure 1:
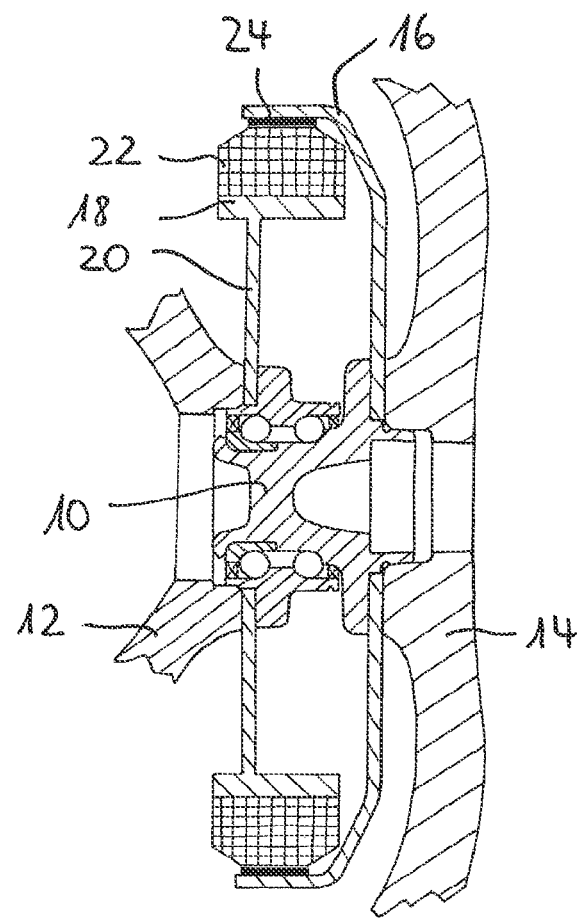
FIG. 1 is a schematic sectional representation of an electric drive unit.

FIG. 1 shows an electric drive unit with a wheel hub drive that drives a vehicle wheel and that is arranged above a wheel bearing 10 on the vehicle wheel that has a wheel carrier 12 and a rim 14, wherein the wheel hub drive has a rotor 16 and a stator 18. The rotor 16 is here advantageously designed in the form of a plate, wherein the rotor 16 can rotate about the stationary stator 18. The stator 18 has a stator mounting 20 and a coil 22 that is arranged on the stator mounting 20 and that can interact with a magnet 24 provided on the rotor 16, in order to be able to initiate a rotational movement of the rotor 16.

Figure 2:
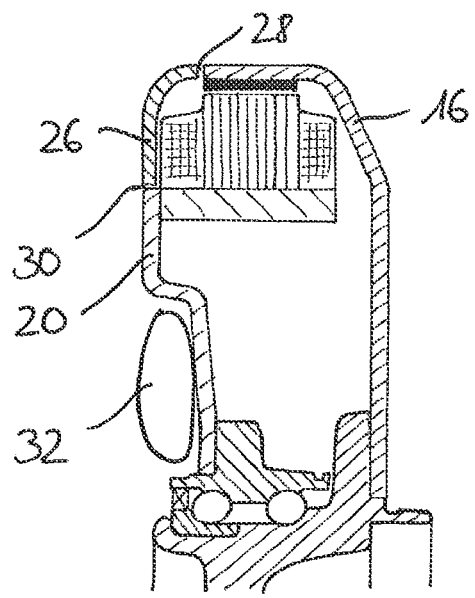
FIG. 2 is a schematic sectional representation of a sub-region of the electric drive unit shown in FIG. 1 with possible positions of a sealing device according to the invention.

FIG. 2 shows a cutout of the electric drive unit shown in FIG. 1, wherein here a cover element 26 is provided between the rotor 16 and the stator mounting 20. As can be seen in FIG. 2, a gap 28 is provided between the cover element 26 and the rotor 16 and a gap 30 is provided between the cover element 26 and the stator mounting 20. In one or in both of these gaps 28, 30, a sealing device according to the invention can be arranged. Furthermore, it is possible to provide another sealing device according to the invention in the region indicated at 32 between the stator mounting 20 and another component not shown here, such as, for example, the wheel carrier 12.

Figure 3:
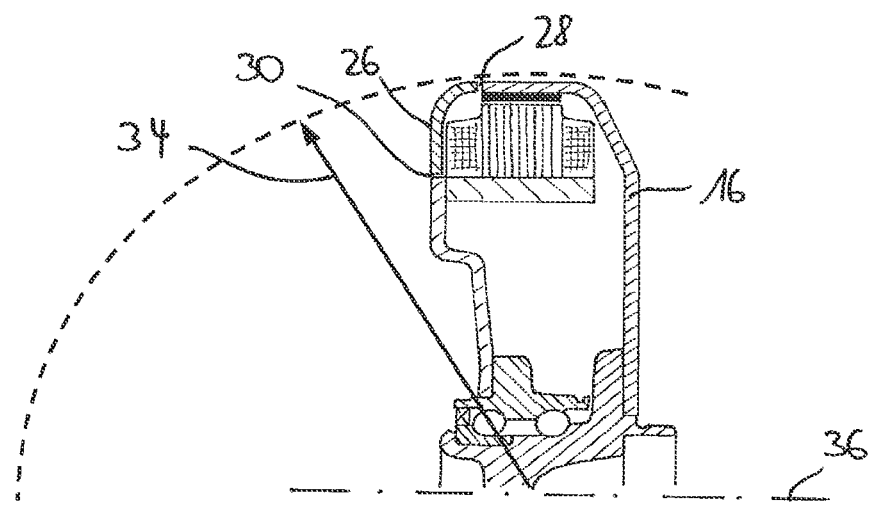
FIG. 3 is a schematic representation of the sectional representation shown in FIG. 2 of the sub-region of the electrical drive unit with a radius drawn in the figure around the tilting axis of the wheel bearing.

FIG. 3 shows a radius 34 along which a tilting of the wheel hub drive can take place with center about a virtual tilting axis 36 of the wheel bearing 10. In order to be able to achieve an optimum sealing effect of the sealing device according to the invention, the sealing surface of the sealing device is arranged on the radius 34 with center around the virtual tilting axis 36 of the wheel bearing 10 or essentially along a tangent to this radius 34. This is shown in FIGS. 4-8 in each of which embodiments for the design of the sealing device according to the invention are shown.

Figure 4:
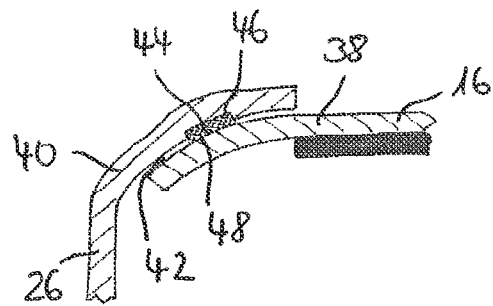
FIG. 4 is a schematic sectional representation of a sealing device according to the invention according to a first embodiment.

FIG. 4 shows a sectional representation of a sub-region 38, for example, of the rotor 16, and a sub-region 40, for example, of the cover element 26, wherein these sub-regions 38, 40 are arranged overlapping each other and wherein a gap 42 is provided between these sub-regions 38, 40, with this gap being sealed with a sealing device 44 according to the invention. The gap 42 can be designated as the gap 28, 30 and/or can be provided in the region 32. The sealing device 44 is here arranged at least partially in a recess 46 provided on the sub-region 40 of the cover element 26. The sub-regions 38, 40 are here formed such that the sealing surfaces 48 of the sealing device 44 follow the radius 34.

Figure 5:
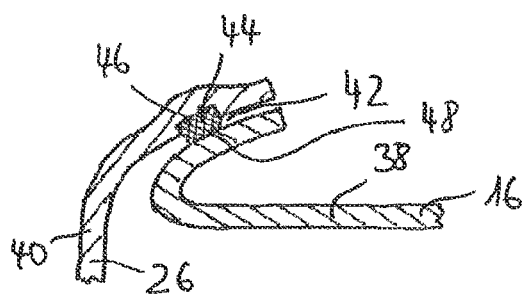
FIG. 5 is a schematic sectional representation of a second embodiment of the sealing device according to the invention.

FIG. 5 shows another embodiment of the sealing device 44 according to the invention, wherein here the sealing device 44 is provided, in turn, between a sub-region 38 and a sub-region 40. The sub-region 38 is here recessed in the region of the sealing device 44 against its designed direction, wherein the recess is realized such that the sealing device 44 lies on the radius 34 in the sub-region 38. The recessed design of the sub-region 38 allows improved access to the gap 42. In addition, according to the installation situation, the sealing effect of the sealing device 44 can be increased, in particular, when the sealing device 44 has a sealing element in the form of a labyrinth seal. Also for the embodiments shown in FIG. 5, the sealing device 44 is provided in a recess 46 of the sub-region 40.

Figure 6:
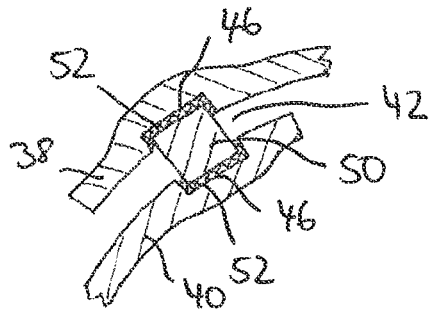
FIG. 6 is a schematic sectional representation of a third embodiment of the sealing device according to the invention.

FIG. 6 shows an embodiment of the sealing device 44 according to the invention in which the sealing device 44 has a ring element 50 that is set in the gap 42 to be sealed and can slide on a provided filling 52 on two sides. The filling 52 is here provided in the recesses 46 provided in the sub-regions 38, 40. By providing a sliding ring element 50 it is possible to distribute the shear rate in the sub-regions 38, 40 to two recesses 46 and thus to reduce it by half.

Figure 7:
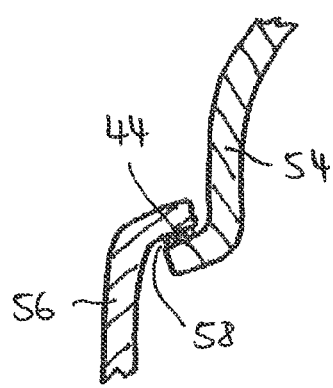
FIG. 7 is a schematic sectional representation of a fourth embodiment of the sealing device according to the invention.
Figure 8:
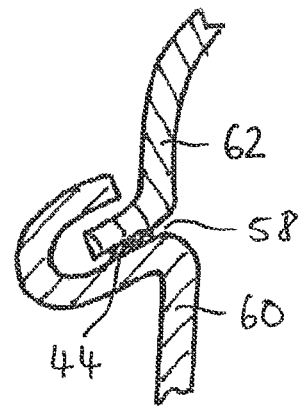
FIG. 8 is a schematic sectional representation of a fifth embodiment of the sealing device according to the invention.

FIG. 7 and FIG. 8 each shows embodiments for the sealing device 44 according to the invention that is preferably arranged on the gap 30 and/or in the region 32.

In FIG. 7, the sub-regions 54, 56 have a bent design at a certain angle, wherein the angle of the bend advantageously corresponds to a tangent to the radius 34, so that the provided sealing device 44 is arranged along this tangent, in that the sealing device 44 is provided in the gap 58 between the sub-regions 54, 56.

In the embodiment shown in FIG. 8, a sub-region 60 for forming a labyrinth is bent such that this can enclose, at least partially, the sub-region 62 that is sealed with the sub-region 60. Therefore it is possible that the sealing device 44 can be provided in an especially protected way within a gap 58.

Figure 9:
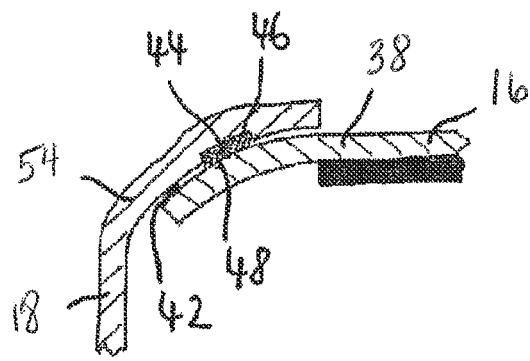
FIG. 9 is a schematic sectional representation of a sixth embodiment of the sealing device according to the invention.
Figure 10:
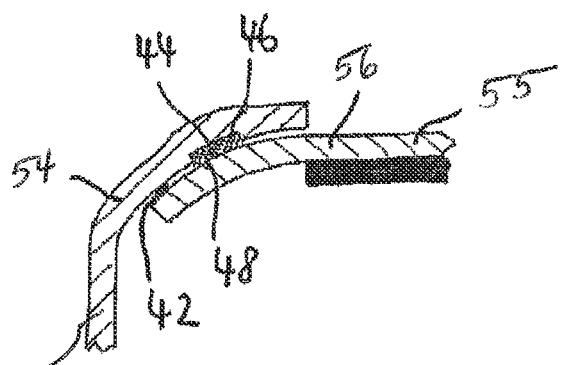
FIG. 10 is a schematic sectional representation of a seventh embodiment of the sealing device according to the invention.
Figure 11:
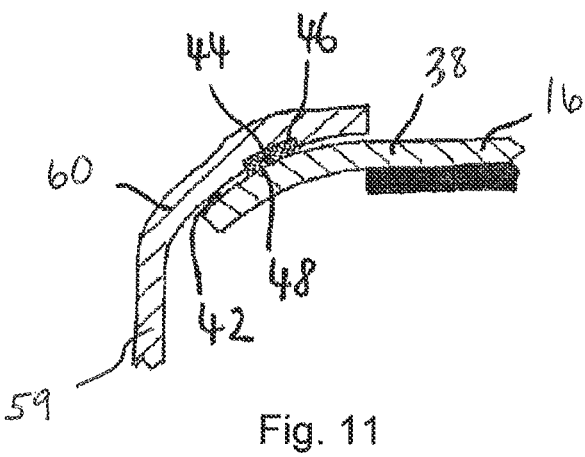
FIG. 11 is a schematic sectional representation of an eight embodiment of the sealing device according to the invention.

The sub-regions 38, 40, 54, 56, 60, 62 can be sub-regions of the rotor 16, the stator 18, the cover element 26, or other components of the wheel hub drive. As shown in FIG. 9, the sub-region 54 of the stator 18 is arranged overlapping with the sub-region 38 of the rotor 16. As shown in FIG. 10, the sub-region 54 of the stator 18 is arranged overlapping with a sub-region 56 of a component 55 adjacent to the stator 18. As shown in FIG. 11, the sub-region 38 of the rotor 16 is arranged overlapping with a sub-region 60 of a component 59 adjacent to the rotor 16.

LIST OF REFERENCE SYMBOLS

10 Wheel bearing
12 Wheel carrier
14 Rim
16 Rotor
18 Stator
20 Stator mounting
22 Coil
24 Magnet
26 Cover element 28 Gap
30 Gap
32 Region
34 Radius
36 Tilting axis
38 Sub-region
40 Sub-region
42 Gap
44 Sealing device
46 Recess
48 Sealing surface
50 Ring element
52 Filling
54 Sub-region
56 Sub-region
58 Gap
60 Sub-region
62 Sub-region

The invention claimed is:

1. Electrical drive unit for a motor vehicle, comprising
a wheel hub drive that drives a vehicle wheel and that is arranged above a wheel bearing on the vehicle wheel,
the wheel hub drive has a rotor and a stator,
a sealing device is provided between at least one of: (a) the rotor and the stator, (b) the rotor and a component adjacent to the rotor, or (c) the stator and a component adjacent to the stator,
wherein a sealing surface of the sealing device is arranged on a surface of a spherical frustum defined by a first radius with a center around a virtual tilting axis of the wheel bearing or essentially along a tangent of the spherical frustum, and the sealing surface is axially offset from a second radius extending normal to the center around the virtual titling axis of the wheel bearing.

2. Electrical drive unit according to claim 1, wherein the sealing surface has a dome shape with the center around the virtual tilting axis of the wheel bearing.

3. Electrical drive unit according to claim 1, wherein the sealing device has a sealing element that is designed as a gap seal.

4. Electrical drive unit according to claim 1, wherein the sealing device has a grease ring or an elastic filler or a plastic filler.

5. Electrical drive unit according to claim 1, wherein the sealing device is arranged at least partially in a recess provided on at least one of the rotor, the stator, or the component adjacent to the stator.

6. An electric motor vehicle, comprising an electrical drive unit according to claim 1.

7. Electrical drive unit for a motor vehicle, comprising
a wheel hub drive that drives a vehicle wheel and that is arranged above a wheel bearing on the vehicle wheel,
the wheel hub drive has a rotor and a stator,
a sealing device is provided between at least one of: (a) the rotor and the stator, (b) the rotor and a component adjacent to the rotor, or (c) the stator and a component adjacent to the stator,
wherein a sealing surface of the sealing device is arranged on a radius with a center around a virtual tilting axis of the wheel bearing or essentially along a tangent to the radius, wherein the sealing device has a ring element, and the ring element has a sliding arrangement.

8. Electrical drive unit for a motor vehicle, comprising
a wheel hub drive that drives a vehicle wheel and that is arranged above a wheel bearing on the vehicle wheel,
the wheel hub drive has a rotor and a stator,
a sealing device is provided between at least one of: (a) the rotor and the stator, (b) the rotor and a component adjacent to the rotor, or (c) the stator and a component adjacent to the stator,
wherein a sealing surface of the sealing device is arranged on a radius with a center around a virtual tilting axis of the wheel bearing or essentially along a tangent to the radius,
wherein in a region of the sealing device, at least one of: (a) a sub-region of the stator is arranged overlapping with a sub-region of the rotor, (b) a sub-region of the stator is arranged overlapping with a sub-region of the component adjacent to the stator, or (c) a sub-region of the rotor is arranged overlapping with a sub-region of the component adjacent to the rotor.

* * * * *